United States Patent
Oh et al.

(10) Patent No.: US 10,776,297 B2
(45) Date of Patent: Sep. 15, 2020

(54) METHOD AND DEVICE FOR OPERATING TRIGGER BETWEEN ELECTRONIC DEVICES AND JACK ACCESSORY SUPPORTING THE SAME

(71) Applicant: Samsung Electronics Co., Ltd., Gyeonggi-do (KR)

(72) Inventors: Younghak Oh, Seoul (KR); Soji Kang, Seoul (KR); Jihun Lee, Seoul (KR); Yusin Jung, Seoul (KR); Seungpyo Hong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 565 days.

(21) Appl. No.: 14/813,952

(22) Filed: Jul. 30, 2015

(65) Prior Publication Data
US 2016/0034410 A1  Feb. 4, 2016

(30) Foreign Application Priority Data

Jul. 30, 2014 (KR) ........................ 10-2014-0097449

(51) Int. Cl.
  *G06F 13/38* (2006.01)
  *G06F 13/28* (2006.01)
  *G06F 13/40* (2006.01)
(52) U.S. Cl.
  CPC ............ *G06F 13/385* (2013.01); *G06F 13/28* (2013.01); *G06F 13/4022* (2013.01)

(58) Field of Classification Search
  CPC ..... G06F 13/385; G06F 13/28; G06F 13/4022
  See application file for complete search history.

(56) References Cited

U.S. PATENT DOCUMENTS

| | | | |
|---|---|---|---|
| 7,914,341 B2 | 3/2011 | Chung et al. | |
| 2003/0144040 A1* | 7/2003 | Liu | H04M 1/6058 455/575.2 |
| 2005/0108462 A1* | 5/2005 | Choi | H04H 20/57 711/5 |
| 2005/0154941 A1* | 7/2005 | Lee | H04M 1/72519 714/42 |
| 2010/0279262 A1* | 11/2010 | Lecat | A61B 7/00 434/266 |
| 2013/0162538 A1* | 6/2013 | Ichieda | G06F 3/033 345/163 |
| 2014/0370818 A1* | 12/2014 | Luna | H04W 4/008 455/41.3 |

* cited by examiner

*Primary Examiner* — Idriss N Alrobaye
*Assistant Examiner* — Ronald T Modo
(74) *Attorney, Agent, or Firm* — The Farrell Law Firm, P.C.

(57) ABSTRACT

A trigger operation method of an electronic device is provided. The trigger operation method includes when a trigger jack device is connected to a jack interface, configuring trigger execution information on the basis of at least one of sharing configuration information related to a task in progress, configuration change information, and communication connection configuration information, and recording the trigger execution information in the trigger jack device connected to the jack interface.

8 Claims, 9 Drawing Sheets

METHOD AND DEVICE FOR OPERATING TRIGGER BETWEEN ELECTRONIC DEVICES AND JACK ACCESSORY SUPPORTING THE SAME

PRIORITY

This application claims priority from under 35 U.S.C. § 119(a) to Korean Patent Application Serial No. 10-2014-0097449, filed in the Korean Intellectual Property Office on Jul. 30, 2014, the entire content of which is incorporated herein by reference.

BACKGROUND

1. Field of the Invention

The present invention relates generally to a method and a device for performing a trigger operation, and a jack accessory that supports the same.

2. Description of the Related Art

With the development of communication technologies and the Internet, electronic devices provide various functions, such as photographing, messaging, voice and video calls, social networking services, etc. An interest in sharing or transmitting data between electronic devices, in order for a user to communicate with the electronic devices of other users, has gradually increased.

In order to share or transmit data between electronic devices, a complicated series of operations must be performed to configure the electronic devices to communicate with one another Therefore, this presents an inconvenience to those users who are unfamiliar with the electronic devices, and as a result, these users may not make a full use of the various functions of the electronic devices. In addition, the electronic devices are generally unable to store and share configuration values of the device, and are generally only able to share data files that have object formats (e.g., jpg, mp3, avi, etc.).

SUMMARY

The present invention has been made to address at least the problems and disadvantages described above, and to provide at least the advantages described below.

Accordingly, an aspect of the present invention is to store and share configuration information on a communication connection between electronic devices, configuration information for sharing files, or configuration change values, using a jack interface that is commonly provided in electronic devices, to easily support the execution of functions of sharing data and connecting communication between electronic devices.

Accordingly, another aspect of the present invention is to provide a protocol, which can be commonly executed regardless of the type of platform or electronic device, without storing instructions through the electronic device in advance, and which can be stored in a jack accessory device, and then may be shared between electronic devices to easily trigger instructions for executing transmitted files, sharing files, configuring communication connections, etc.

In accordance with an aspect of the present invention, a trigger operation method of an electronic device is provided. The trigger operation method includes when a trigger jack device is connected to a jack interface, configuring trigger execution information on the basis of at least one of sharing configuration information related to a task in progress, configuration change information, and communication connection configuration information, and recording the trigger execution information in the trigger jack device connected to the jack interface.

In accordance with another aspect of the present invention, an electronic device is provided. The electronic device includes a communication unit that communicates with at least one external device a jack interface that includes one or more connection ports, the jack interface for connecting an accessory device and a controller that detects a connection of a trigger jack device to the jack interface, configures trigger execution information on the basis of at least one of sharing configuration information related to a task in progress, configuration change information, and communication connection configuration information, and records the trigger execution information in the trigger jack device.

In accordance with another aspect of the present invention, a trigger jack accessory device is provided. The trigger jack accessory device includes a jack plug that is inserted into a jack interface of an electronic device and includes one or more connection ports for transmitting/receiving signals, and a memory that stores signals and data, which are transferred through the one or more connection ports of the jack plug

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE EMBODIMENTS OF THE PRESENT INVENTION

Hereinafter, a method and a device, according to an embodiment of the present invention, will be described in detail with reference to the accompanying drawings. In the following description of the present invention, a detailed description of related well-known functions or structures incorporated herein will be omitted when it may make the subject matter of the present invention unclear.

The terms and words used in the present specification and claims should not be interpreted as being limited to their typical meaning based on the dictionary definitions thereof, but should be interpreted to have meanings and the concept relevant to the technical spirit of the present invention. Accordingly, the embodiments described in the present specification and constructions shown in the drawings are only embodiments of the present invention, and do not represent all technical spirits of the present invention. Therefore, it should be understood that various equivalents and modified embodiments capable of replacing these embodiments may exist.

In various embodiments of the present invention, the electronic device (e.g., smart phones, tablet PCs, etc.) may be connected to networks through wired/wireless communication, and applications may be freely installed in and deleted from the electronic device. The networks include the Internet and mobile communication networks.

Figure 1:
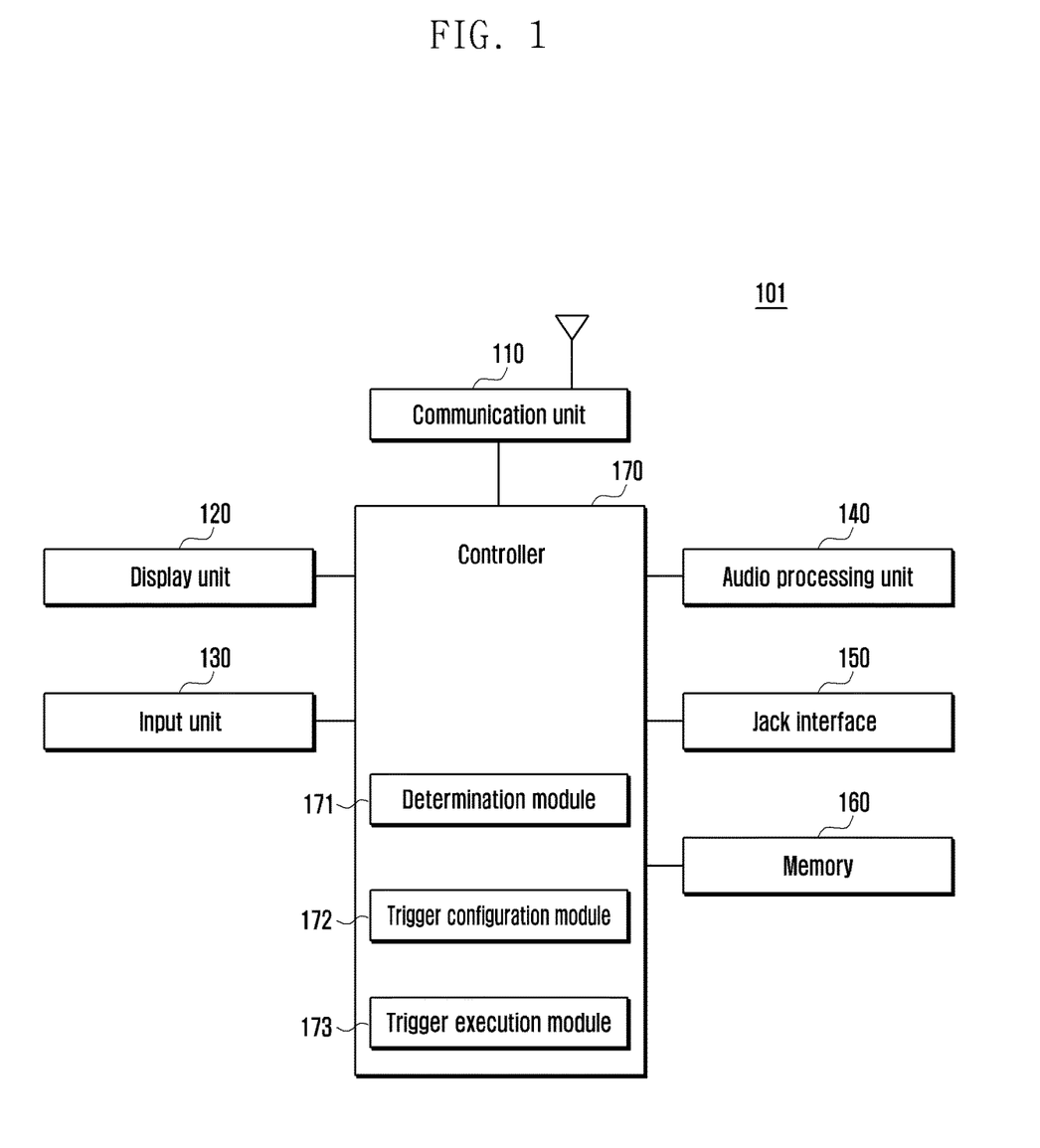
FIG. 1 is a block diagram of an electronic device, according to an embodiment of the present invention.

FIG. 1 is a block diagram of an electronic device, according to an embodiment of the present invention.

Referring to FIG. 1, the electronic device 101 is provided. The electronic device 101 includes a communication unit 110, a display unit 120, an input unit 130, an audio processing unit 140, a jack interface 150, a memory 160, and a controller 170.

The communication unit 110 is connected with a network through wired/wireless communication to perform voice communication, video communication, or data communication with external devices (e.g., other electronic devices, a server, etc.) under the control of the controller 170. The wireless communication includes at least one of, for example, WiFi, Bluetooth (BT), Near Field Communication (NFC), a Global Positioning System (GPS), or cellular communication (e.g., Long Term Evolution (LTE), LTE-A, Code Division Multiple Access (CDMA), Wideband CDMA (WCDMA), Universal Mobile Telecommunication System (UMTS), Wireless Broadband (WiBro), and Global System for Mobile (GSM) communication). The wired communication includes at least one of, for example, a Universal Serial Bus (USB), a High Definition Multimedia Interface (HDMI), Recommended Standard 232 (RS-232), or a Plain Old Telephone Service (POTS).

The display unit 120 displays images and data to a user. The display unit 120 includes a display panel. For example, the display panel may adopt a Liquid Crystal Display (LCD), or an Active Matrix-Organic Light Emitting Diode (AM-OLED). The display unit 120 includes a controller that controls the display panel. The display panel may be configured to be flexible, transparent, or wearable. The display unit 120 may be combined with a touch panel as a module (e.g., a touch screen).

The input unit 130 includes a touch panel, a pen sensor, and keys. The touch panel recognizes a user's touch input in a manner of a capacitive type, a pressure type, an infrared type, or an ultrasonic type. The touch panel may include a controller. The touch panel provided in the capacitive type detects proximity, as well as a touch. The pen sensor may be implemented, for example, by a pen recognition sheet, and operates in the same manner as the user touch recognition. The keys include mechanical keys or touch keys.

The audio processing unit 140 transmits and receives audio signals, and performs encoding and decoding of the same. The audio processing unit 140 is connected with a microphone and a speaker to convert voice signals input from the microphone into data to be transmitted to the controller 170. The audio processing unit 140 converts voice signals input from the controller 170 into analog signals to be output through the speaker. The audio processing unit 140 outputs various audio signals (e.g., audio signals by reproducing MP3 files or video files) that are created in the electronic device through the speaker.

The jack interface 150 transmits and receives signals or data to and from a connected external jack accessory device. The jack interface 150 may be an ear jack or an audio jack, but it is not limited thereto, and may be a USB connector or a twenty-pole connector for transmitting and receiving data. The jack interface 150 includes connection ports that recognize the type of the jack accessory device, or the operation status of a jack accessory key. The connection ports may include a left audio port, a right audio port, a microphone port, and a ground port. For example, when earphones are connected to the jack interface 150, the jack interface 150 transfers audio signals from the audio processing unit 140 to the earphones. The jack interface 150 also transfers audio signals from the microphone of the earphones to the audio processing unit 140.

The jack interface 150 includes a path for transmitting and receiving audio/microphone signals, and a switching module that switches a path for transmitting and receiving a trigger signal.

The memory 160 stores instructions or data, which are received from the controller 170 or other elements of the electronic device 101 (e.g., the display unit 120, the input unit 130, and the communication unit 110), or created by other elements. For example, the memory 160 may store an operating system for booting the electronic device 101 and operating the elements above, one or more applications, messages transmitted and received through the network, data resulting from the execution of the applications, etc.

The memory 160 may include programming modules, such as a kernel, middleware, an application programming interface (API), and applications. The programming modules may be configured as software, firmware, hardware, or a combination thereof.

The controller 170 receives instructions from other elements of the electronic device 101 mentioned above (e.g., the communication unit 110, the display unit 120, the input unit 130, the audio processing unit 140, the jack interface 150, and the memory 160), and decodes the received instructions to perform a calculation or a data process according to the decoded instructions. For example, when electrical power is applied to the electronic device 101, the controller 170 controls a process of booting the electronic device 101, and may execute various applications, which are stored in a program area of the memory 160, to perform functions according to a user's setup of the electronic device 101. The controller 170 may include one or more application processors (AP), or one or more communication processors (CP).

The controller 170 includes a determination module 171, a trigger configuration module 172, and a trigger execution module 173.

The determination module 171 detects the insertion of a jack plug of the jack accessory device into the jack interface 150. The determination module 171 recognizes a voltage applied through a connection with the jack accessory device to thereby recognize the type of jack accessory device, the connection status of the jack accessory device, the operation status thereof, etc. For example, the determination module 171 may determine whether the jack accessory device is the earphones or a trigger jack device through a difference in the voltages created by the connection between the jack interface 150 and the jack accessory device.

The determination module 171 determines whether the trigger jack device is in a writing state in which information has not been recorded yet or in a reading state in which information has already been recorded. The writing state refers to a formatted state in which information has not been recorded in a memory of the trigger jack device. The reading state refers to a state in which data has been recorded in the memory of the trigger jack device. For example, the determination module 171 may determine the state of the trigger jack device through indication information stating the writing/reading state of data in the trigger jack device (e.g., recording data of write (1)/read (0) in an extra bit).

The determination module 171 determines the writing state of the trigger jack device as a trigger configuration function, and determines the reading state thereof as a trigger execution function.

Additionally, the determination module 171 determines whether the jack accessory device, which is connected to the jack interface 150, corresponds to an earphone function or a trigger function. For example, the determination module 171 determines whether the jack accessory device corresponds to an earphone function or a trigger jack function by means of a switching signal transferred through the jack accessory device.

If it is determined that the connected jack accessory device corresponds to the trigger configuration function, the trigger configuration module 172 identifies a task related to an application or content in progress in the electronic device 101. The application or content in progress may be displayed on a screen of the electronic device 101 (e.g., on a screen in the foreground). The trigger configuration module 172 identifies sharing configuration information related to the task, communication configuration information, for connecting the electronic device 101 to other electronic devices, and configuration values included in configuration change information. The trigger configuration module 172 configures information on sharing instructions, communication connection instructions, and the execution of instructions.

Additionally, the trigger configuration module 172 identifies a trigger function related to a task in progress on a screen of the electronic device 101, and configures execution information of the trigger function. The trigger function may be a sharing function, a function for connecting devices, or a configuration changing function. However, the trigger function is not limited thereto, and may further include other functions that can be executed in other devices through an operation sequence and configuration values. The execution information includes configuration values (e.g., configuration values of a task, configuration values of hardware related to a task, configuration values for communication connection authentication, etc.), an operation condition, and an operation sequence (e.g., a sequence of communication connection operation, function execution operation, etc.).

The trigger configuration module 172 writes the trigger execution information in the memory of the trigger jack device. For example, when items for the selection by a user of the electronic device 101 are displayed in a single application or on a screen in the foreground of the electronic device 101, the trigger configuration module 172 identifies configuration information on the items, and writes the configuration information in the trigger jack device. The trigger configuration module 172 writes indication information stating that the trigger execution information has been recorded in the trigger jack device.

When the connected trigger jack device is determined to correspond to the trigger execution function, the trigger execution module 173 reads the trigger execution information stored in the memory of the trigger jack device. The trigger execution module 173 identifies a task function through the execution information, and identifies the type of device for the task function. For example, in the case of a task function related to reproduction of video files, if the trigger execution module 173 identifies that the electronic device 101 is unable to display video, the trigger execution module 173 receives only audio data from the electronic device 101 (e.g., from a speaker of the electronic device 101), for the trigger function.

In the case that a plurality of tasks is identified for the trigger function, the trigger execution module 173 informs the user of notification information so that the user can select the execution of the task. For example, in the case that two communication functions are identified for connecting the electronic device 101 with external devices for sharing files, the electronic device 101 may provide notification information to the user through the display unit 120 of the electronic device 101, for the user to select which one of the two communication functions is to be executed by the trigger function.

The trigger execution module 173 executes the trigger function on the basis of the trigger execution information. For example, when the electronic device 101 obtains configuration information on sharing files with an external device, the electronic device 101 controls to communicate with the external device on the basis of the connection address of the external device, connection protocol information, and control information for transmission and reception of signals, included in the configuration information. The electronic device 101 additionally controls to receive the shared files from the external device through the connection. In this case, the trigger execution module 173 provides a selection notification for reception of the shared files to the user through the display unit 120. When a user input for the selection to receive the shared files is detected, the trigger execution module 173 receives the shared files from the external device, and may display the shared files in the display unit 120 or execute a function related to the shared files. The trigger execution module 173 records indication information indicating that the execution information on the trigger function has been read from the trigger jack device.

After the trigger execution module 173 reads the execution information on the trigger function from the trigger jack device, the trigger execution module 173 provides notification information, on whether the trigger jack device is to be formatted, to the user through the display unit 120.

Figure 2:
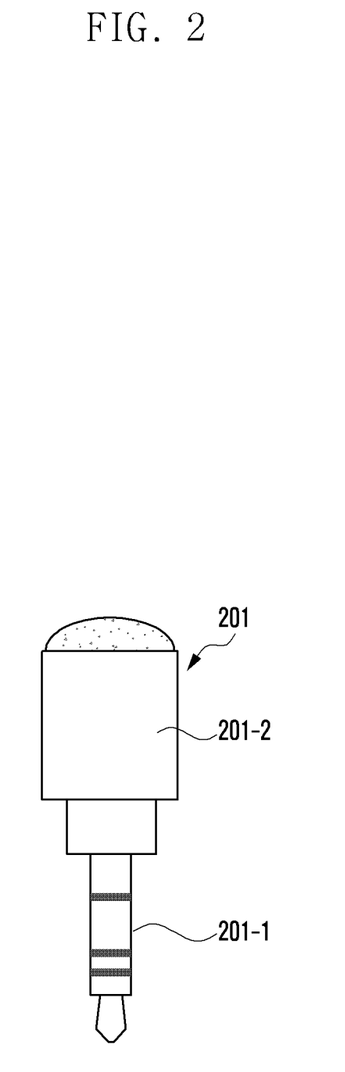
FIG. 2 a schematic diagram of a trigger jack device, according to an embodiment of the present invention.

FIG. 2 is a schematic diagram of a trigger jack device, according to an embodiment of the present invention.

Referring to FIG. 2, the trigger jack device 201 is provided. The trigger jack device 201 includes a jack plug 201-1 and a jack body 201-2.

The jack plug 201-1 is connected with the jack interface (e.g., the jack interface 150) of the electronic device 101, and includes at least one hook-up port to be connected with a connection port of the jack interface 150 for transmitting/receiving signals.

The jack body 201-2 includes at least one of a memory that is able to store trigger execution information received from the electronic device 101, and a processing device to control the transmission/reception of signals.

The jack plug 201-1 of the trigger jack device 201 is inserted into the jack interface 150 of the electronic device 101. The electronic device 101 recognizes the insertion of the trigger jack device 201 through a voltage generated by the connection of the hook-up port of the jack plug 201-1 and the connection port of the jack interface 150.

The trigger jack device 201 receives the trigger execution information from the electronic device 101 and stores the trigger jack information in the memory of the trigger jack device 201. The electronic device 101 may write or read the trigger execution information based on whether the memory of the trigger jack device 201 is in the writing state or in the reading state.

When the trigger jack device 201, which has the trigger execution information recorded therein, is inserted to another electronic device, the other electronic device may read the trigger execution information from the memory of the trigger jack device 201. The other electronic device may execute a trigger function on the basis of configuration values and a task operation sequence, which are included in the trigger execution information. For example, the other electronic device may execute tasks of executing apps, sharing files, connecting networks, or changing configuration. Accordingly, the trigger jack device 201 may be used to store and share communication connection configuration between the electronic devices, configuration information for the file sharing, and configuration change values, and may use the same as means for triggering the execution of functions such as sharing data, or connecting communication in other electronic devices.

Hereinafter, a description will be made of the first electronic device, which performs a trigger configuration operation, and a second electronic device, which performs a trigger execution operation, wherein the electronic device 101 may perform both the trigger configuration operation and the trigger execution operation.

Figure 3:
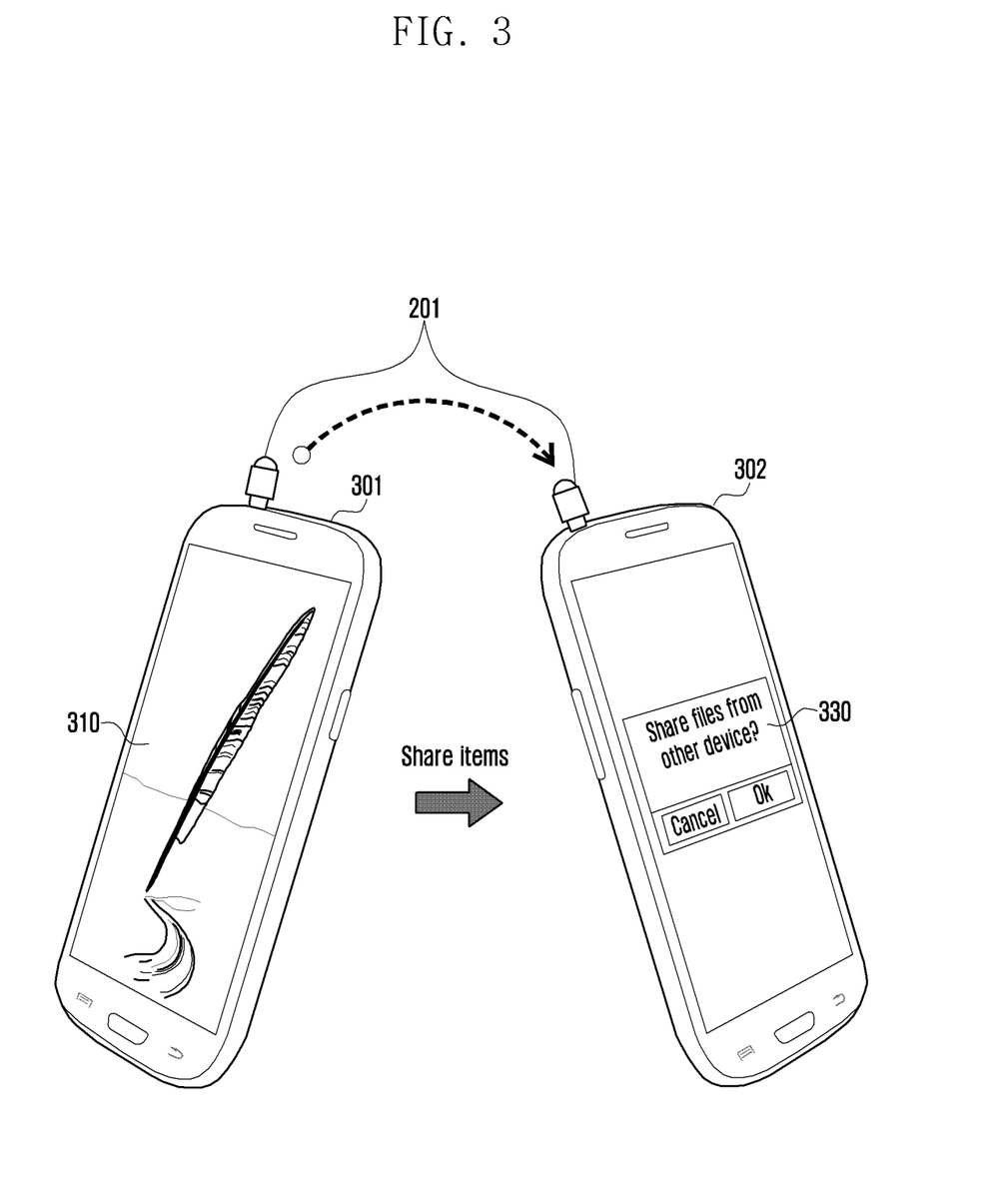
FIG. 3 illustrates a trigger operation method between electronic devices, according to an embodiment of the present invention.

FIG. 3 illustrates a trigger operation method between electronic devices, according to an embodiment of the present invention.

Referring to FIG. 3, a first electronic device 301 and a second electronic device 302 is provided. The first electronic device 301 is described with reference to a configuration operation of the trigger function. The second electronic device 302 is described with reference to an execution operation of the trigger function. The first electronic device 301 and the second electronic device 302 include all of or some of the elements of the electronic device 101.

When a user connects the trigger jack device 201 to the jack interface 150 of a first electronic device 301 the first electronic device 301 detects that the jack plug 201-1 has been inserted into the jack interface 150. For example, the first electronic device 301 detects the insertion of the trigger jack device 201 on the basis of a voltage transferred from the connection port of the electronic device 301 when the jack plug 201-1 is connected to the connection port.

When the trigger jack device 201 is connected, the first electronic device 301 determines whether the trigger jack device 201 is in a writing state or in a reading state. If the trigger jack device 201 is in a writing state in which no information has been recorded, the first electronic device 301 identifies a running task 310 on a screen in the foreground of the first electronic device 301, and writes the trigger execution information related to the task 310 in the trigger jack device 201.

In this case, the first electronic device 301 provides information, which shows that the task execution information is in the process of being transmitted to the trigger jack device 201 or the transmission thereof has been completed, to the user through the display unit 120. The user recognizes the completion of the transmission to the trigger jack device 201 and may detach the trigger jack device 201 from the first electronic device 301.

The user may insert the detached trigger jack device 201 into the second electronic device 302 which has the jack interface 150 as well.

Then, the second electronic device 302 identifies whether the trigger jack device 201 is in a reading state or a writing state. If the second electronic device 302 determines that the trigger jack device 201 is in the reading state, the second electronic device 302 reads the trigger execution information stored in the trigger jack device 201. The second electronic device 302 identifies the trigger execution information that has been read from the trigger jack device 201, and executes the trigger function according to the configuration values and the task operation sequence, on the basis of the trigger execution information.

For example, while the first electronic device 301 is reproducing music, the user may insert the trigger jack device 201, which has been inserted into the first electronic device 301 in advance, into the second electronic device 302. In this case, the second electronic device 302 executes a music reproducing function on the basis of the trigger execution information, related to the music in the process of being reproduced in the first electronic device 301, which is received from the memory of the trigger jack device 201.

The second electronic device 302 may additionally provide notification information 330 to the user through the display unit, which allows the user to determine whether or not the music reproducing function of the first electronic device 301 is to be shared.

Figure 4:
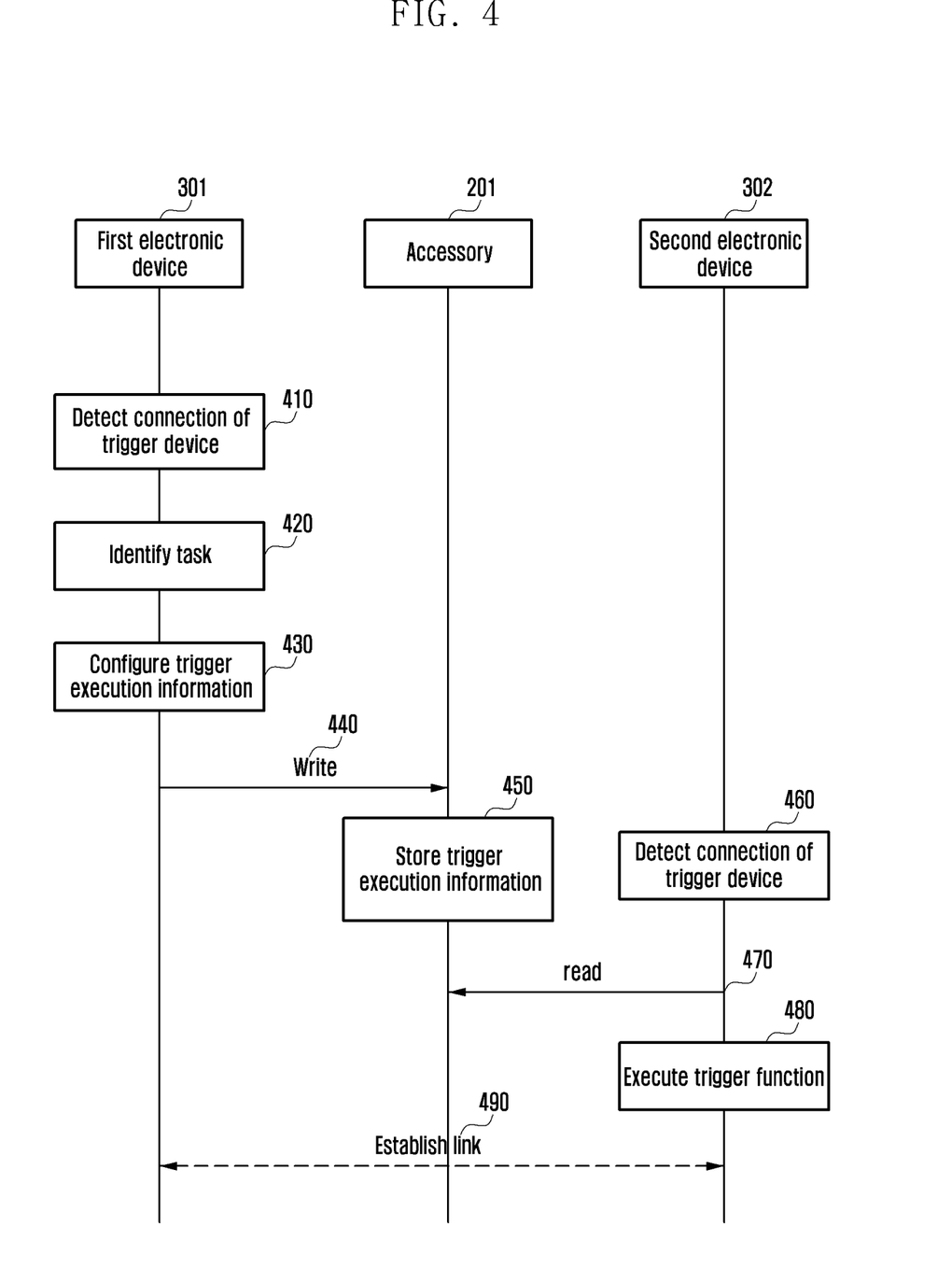
FIG. 4 is a signal flow diagram illustrating a trigger operation method between electronic devices and a jack accessory device, according to an embodiment of the present invention.

FIG. 4 is a signal flow diagram illustrating a trigger operation method between electronic devices and a jack accessory device, according to an embodiment of the present invention.

Referring to FIG. 4, the first electronic device 301 detects the trigger jack device 201 which is connected to the jack interface 150, in step 410. For example, the control unit 170 of the first electronic device 201 receives a connection signal from the jack interface 150 to determine that the trigger jack device 201 is detected, based on the connection signal.

In step 420, the first electronic device 301 identifies the operation of a task displayed on the screen of the first electronic device 301 (e.g. a screen in the foreground) when the trigger jack device 201 is connected to the jack interface 150.

In step 430, the first electronic device 301 determines a trigger function related to the task displayed on the screen, and configures trigger execution information.

For instance, when an application execution image is displayed on the screen, the first electronic device 301 identifies application execution information (an application function, the application-related content, selective option information for a user, and a main function of a currently displayed image, etc.), and configuration information on the electronic device 301 which is related to the application (e.g., internal configuration option information on the device, a volume level, a call value for the currently displayed image, and detailed configuration values of sub-functions, etc.), and configures the trigger execution information related to the execution of the application.

As another example, when a setup configuration image is displayed on the screen, the first electronic device 301 identifies setup configuration values (e.g., control information and security information necessary for a communication connection), or configuration change values (e.g., configuration change information for changing a pairing connection into a WiFi connection), and configures the trigger execution information related to the setup configuration.

As still another example, when shared content is displayed on a screen in the foreground, the first electronic device 301 identifies trigger functions (e.g., a printing function, a fax function, a storage function, a music play function, etc.) that can be executed on the basis of the shared content, and configures the trigger execution information related to the shared content.

In step 440, the first electronic device 301 transfers the trigger execution information through the jack interface 150, and writes the trigger execution information in the memory of the trigger jack device 201.

In step 450, the trigger jack device 201 stores the trigger execution information received from the first electronic device 301.

Next, the user may detach the trigger jack device 201 from the first electronic device, and connect the trigger jack device 201 to the second electronic device 302.

In step 460, the second electronic device 302 detects the connection of the trigger jack device 201, and the second electronic device 302 may identify that the trigger jack device 201 is in the reading state. In operation 470, the second electronic device 302 reads the trigger execution information stored in the memory of the trigger jack device 201.

In step 480, the second electronic device 302 executes the trigger function on the basis of the trigger execution information transferred from the trigger jack device 201. The trigger function, for example, may be a file sharing function, a communication connection configuration function, or an application execution function, but it is not limited thereto.

In step 490, a communication link between the first electronic device 301 and the second electronic device 302 is automatically established due to the execution of the trigger function. For example, if the trigger function corresponds to a function of configuring file sharing, a connection link for transmitting and receiving the shared files is formed between the first electronic device 301 and the second electronic device 302. Alternatively, if the trigger function corresponds to a function of configuring a network tethering connection, a connection link for the tethering connection is formed between the first electronic device 301 and the second electronic device 302.

Figure 5:
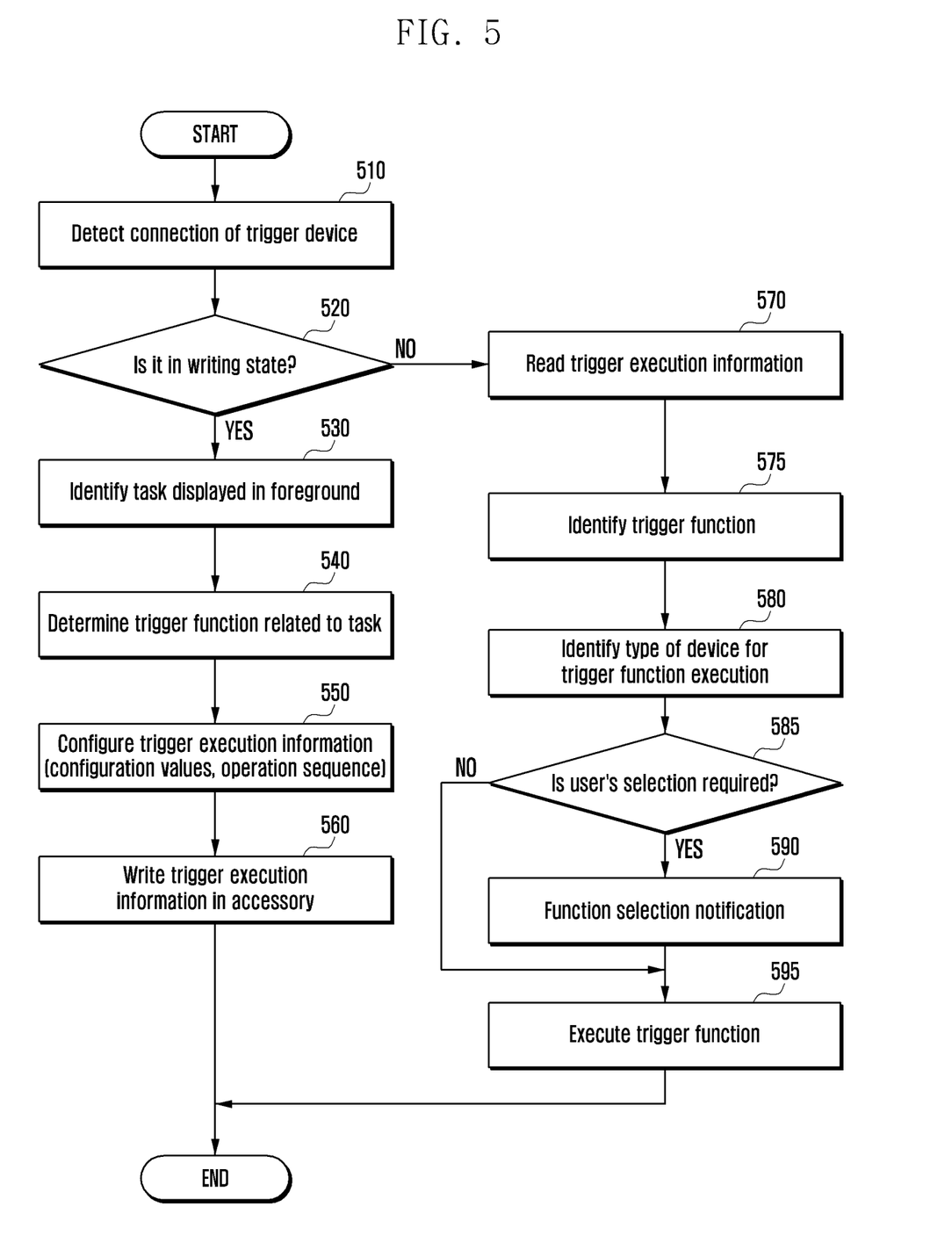
FIG. 5 is a flowchart illustrating a trigger operation method of an electronic device, according to an embodiment of the present invention.

FIG. 5 is a flowchart showing a trigger operation method of an electronic device, according to an embodiment of the present invention.

Referring to FIG. 5, in step 510, the controller 170 of the electronic device 101 detects the connection of the trigger jack device 201.

In step 520, the controller 170 determines whether the trigger jack device 201 is in a writing state. For example, the controller 170 determines the state of the trigger jack device 201 through the indication information which indicates the writing/reading state of data in the memory of the trigger jack device 201 (e.g., recording data of write (1)/read (0) in an extra bit).

In step 530, the controller 170 identifies the task displayed on a screen of the electronic device 101. For example, a task displayed on a screen in the foreground may be identified.

In step 540, the controller 170 determines the trigger function related to the task. For example, when an image is displayed on the screen, the controller 170 shares the image content with another electronic device to, for example, print or fax the image.

In step 550, the controller 170 configures the trigger execution information. For example, the controller 170 configures trigger execution instructions and execution information, based on the task in progress on the screen in the foreground.

In step 560, the controller 170 transfers the trigger execution information to the trigger jack device 201, and writes the same in the memory of the trigger jack device 201.

If the trigger jack device 201 is determined to be in the reading state rather than the writing state, the controller 170 proceeds to step 570 to read the trigger execution information stored in the trigger jack device 201.

In step 575, the controller 170 identifies the trigger function on the basis of the trigger execution information read from the trigger jack device 201. For example, the controller 170 executes the trigger function on the basis of trigger execution instructions, configuration values, and a task operation sequence.

In step 580, the controller 170 identifies the type of device related to the execution of the trigger function and the number of trigger functions.

In step 585, the controller 170 determines whether or not a user selection is required for the trigger function execution. For example, when two or more trigger functions can be executed, the controller 170 provides notification information to the user so that the user can select one of the functions.

In step 590, the controller 170 provides the notification information for the user's selection of the function, and collects information on the selection of the trigger function.

In step 595, the controller 170 executes the trigger function on the basis of the trigger execution information stored in the trigger jack device 201. For example, when the controller 170 identifies more than one trigger function that can be executed and the user selects the trigger function to execute, the controller 170 executes the function selected by the user. When a single trigger function is identified, the controller 170 automatically executes the trigger function on the basis of the information stored in the trigger jack device 201.

Figure 6:
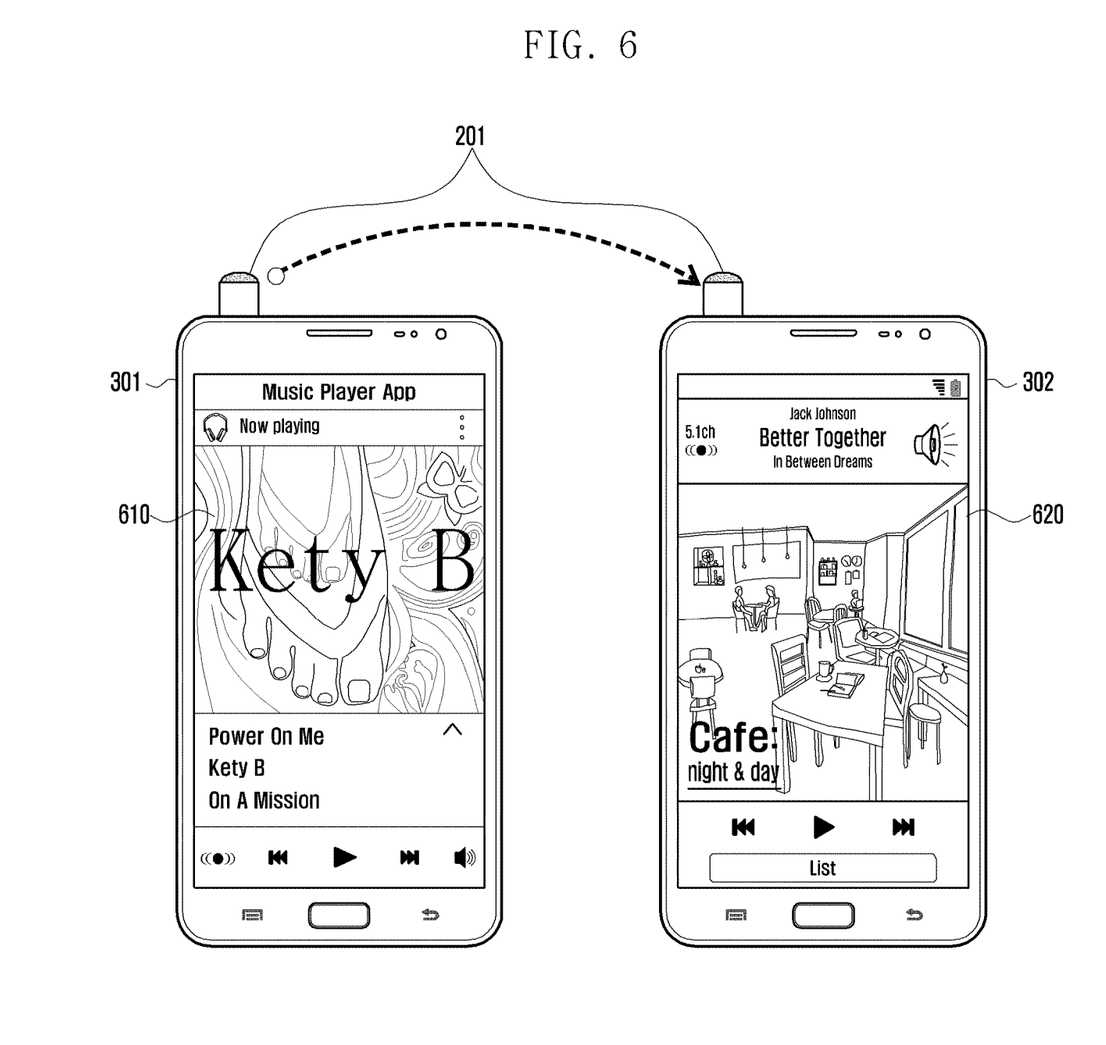
FIGS. 6 and 7 illustrate examples of using a trigger jack device, according to an embodiment of the present invention.
Figure 7:
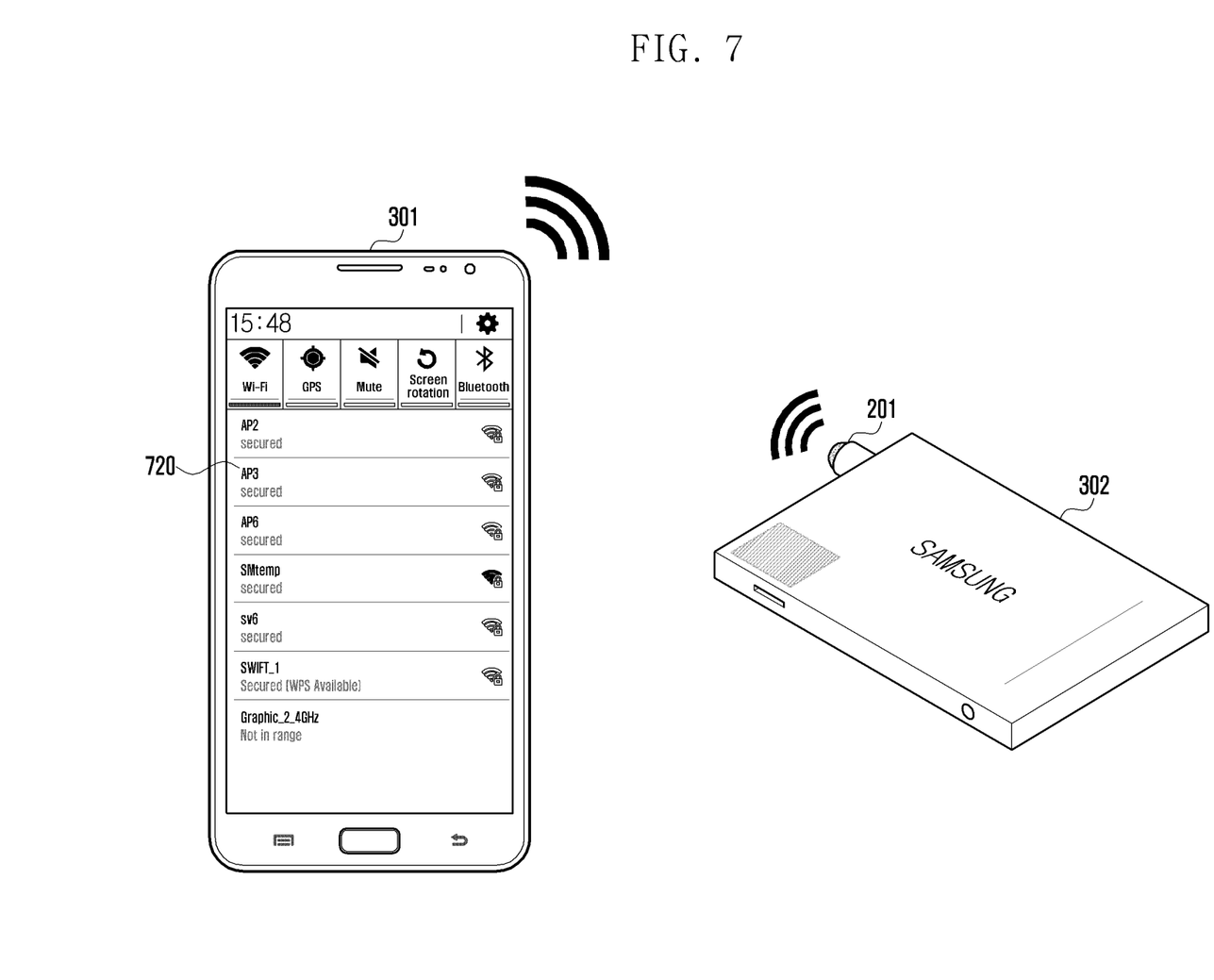

FIGS. 6 and 7 illustrate examples of using the trigger jack device, according to an embodiment of the present invention.

Referring to FIGS. 6 and 7, the first electronic device 301 and the second electronic device 302 may include all of or some of the configuration of the electronic device 101 illustrated in FIG. 1.

Referring to FIG. 6, the trigger jack device 201 supports a trigger function for the file sharing. The first electronic device 301 is displaying the content 610 to be shared in the display unit. For example, if the user wishes to share music files with an external device (such as the second electronic device 302) for reproducing the same, the user may connect the trigger jack device 201 to the jack interface 150 of the first electronic device 301 while reproducing the music.

Then, the first electronic device 301 transfers the trigger execution information related to the reproduction of music to the trigger jack device 201 through the jack interface 150, and writes the trigger execution information to the trigger jack device 201. In this case, the trigger execution information is configuration values related to the music reproducing task (e.g., music volume, music reproducing time, detailed music content information, etc.) or task operation sequence information.

The user may detach the trigger jack device 201 from the first electronic device 301, and may connect the trigger jack device 201 to the second electronic device 302. Then, the second electronic device 302 reads the trigger execution information related to the music reproduction from the trigger jack device 201 without a separate user input.

The second electronic device 302 reproduces the music content 620, which is in the process of being reproduced in the first electronic device 301, in the second electronic device 302 on the basis of the trigger execution information read from the trigger jack device 201.

In this case, a connection link is established between the first electronic device 301 and the second electronic device 302 for sharing the files of music content on the basis of the trigger execution information, and the second electronic device 302 receives the music content data from the first electronic device 301 through wireless communication.

As another example, when the first electronic device 301 displays a document image to be shared, the second electronic device 302 may execute functions of printing or faxing the document image of the first electronic device 301 using the trigger jack device 201. For example, in the case where the second electronic device 302 is capable of performing a printing function, the second electronic device 302 is provided with trigger execution information related to the document image of the first electronic device 301, through the trigger jack device 201. The second electronic device 302 receives the document image from the first electronic device 301, based on the trigger execution information, and automatically prints the received document image.

Referring to FIG. 7, the trigger jack device 201 may additionally support a trigger function for setup configuration, as shown in FIG. 7. For example, the user may wish to change an option for a network connection setup between the electronic devices. However, in the case of an electronic device (such as electronic device 302) that has no display unit, it may be difficult to change the network connection configuration between the electronic devices. For example, in the first electronic device 301, the user may change the network connection configuration between the first electronic device 301 and the second electronic device 302 from a Bluetooth connection to a WiFi connection. Afterwards, the user may insert the trigger jack device 201 into the jack interface 150 of the first electronic device 301 that has been changed to the WiFi connection.

Then, the first electronic device 301 detects the insertion of the trigger jack device 201, and identifies whether the task displayed on the screen is a setup configuration image 720, to recognize that a configuration option of a network connection has been changed. The first electronic device 301 writes the trigger execution information related to the configuration change in the trigger jack device 201.

The user recognizes that trigger execution information has been recorded in the trigger jack device 201, and then may insert the trigger jack device 201 into the jack interface 150 of the second electronic device 302.

Then, the second electronic device 302 changes the network communication connection configuration with the first electronic device 301 from Bluetooth to WiFi on the basis of the trigger execution information related to the connection configuration change read from the trigger jack device 201.

Figure 8:
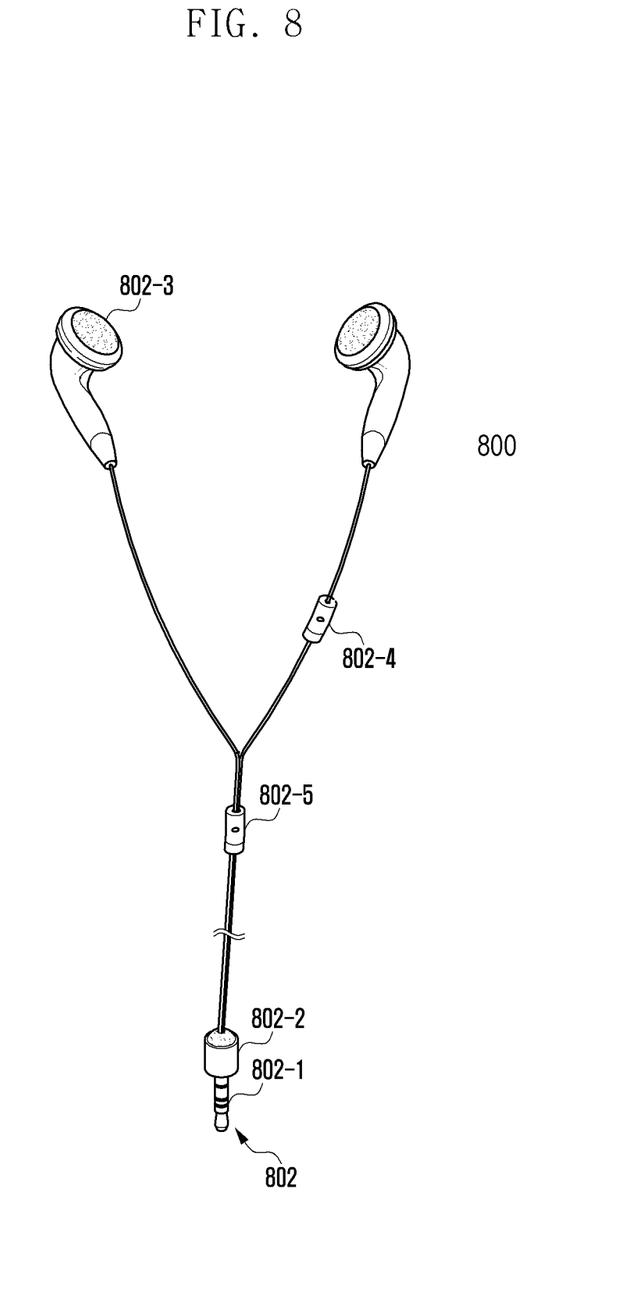
FIG. 8 is a schematic diagram of a trigger jack device connected to earphones, according to an embodiment of the present invention.

FIG. 8 is a schematic diagram of a trigger jack device connected to earphones, according to an embodiment of the present invention.

Referring to FIG. 8, trigger jack device 802 is connected with earphones 800. The trigger jack device 802 includes a jack plug 802-1 and a jack body 802-1, which are the same as those of the trigger jack device 201 described with reference to FIG. 2, thus a detailed description thereof will be omitted.

The trigger jack device 802 and the earphones 800 may be connected to the electronic device 101 using a single jack plug 802-1. The earphones may be tripole earphones or quadrupole earphones. In the case of adopting a single jack plug 802-1, the trigger jack device 802 may change signals generated from the connection port by making the voltages different using a switching module 802-5 included in the earphones 800.

For example, the earphones 800 include an ear pad 802-3 for outputting audio signals, a microphone 802-4 for receiving audio, such as a voice, and a switching module 802-5 to switch between an earphone function mode and a trigger function mode. For example, when a signal for a switch to the earphone function mode is received from the trigger jack device 802 to the electronic device 101, the electronic device 101 controls to change the signal path of the jack interface 150 into an audio/microphone signal transmission/reception path. When a signal for a switch to the trigger function mode is received from the trigger jack device 802, the electronic device 101 controls to change the signal path of the jack interface 150 into a trigger signal transmission/reception path.

Figure 9:
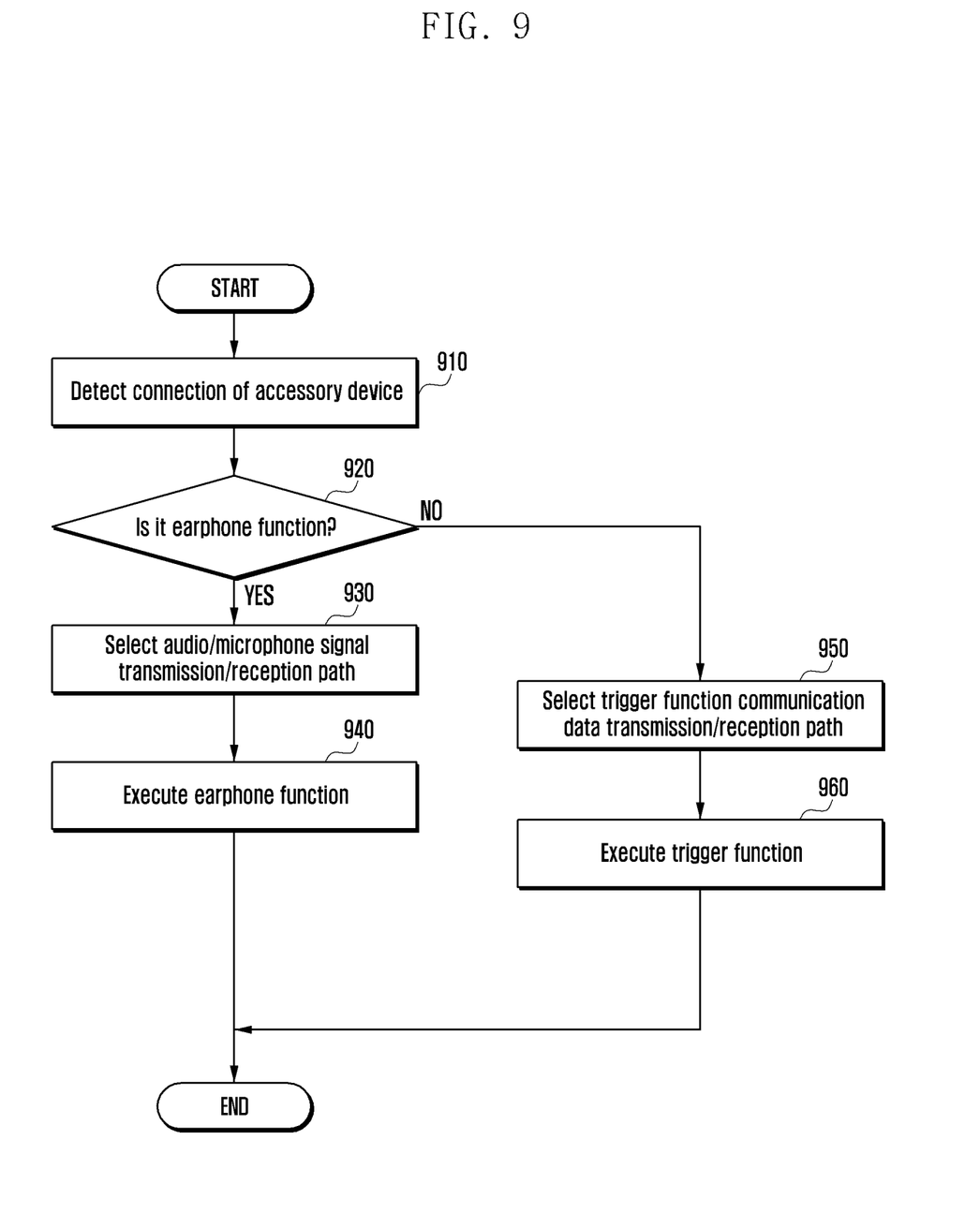
FIG. 9 is a flowchart illustrating a trigger operation method of an electronic device, according to an embodiment of the present invention.

Hereinafter, example of an operation in the case where the trigger jack device 802 combined with the earphones 800 is inserted into the electronic device 101 will be described FIG. 9 is a flowchart illustrating a trigger operation method of an electronic device, according to another embodiment of the present invention.

Referring to FIG. 9, the controller 170 of the electronic device 101 detects the connection of a jack accessory device connected to the jack interface 150, in step 910. For example, the controller 170 may recognize that the jack accessory device has been connected on the basis of a voltage created through the connection port of the jack interface 150 and the hook-up port of the jack accessory device.

In step 920, the controller 170 determines whether the jack accessory device is to perform an earphone function. For example, the controller 170 identifies the type of jack accessory device on the basis of a voltage created according to the number of connection ports or the type thereof. The controller 170 controls to switch a communication transmission/reception path with the jack accessory device based on the type of the jack accessory device.

In step 930, when the earphones 800 are connected to the jack interface 150, the controller 170 controls to connect with the earphones 800 through the path for transmitting/receiving the audio signals and/or the microphone signals.

In step 940, the controller 170 performs the earphone function between the jack accessory device and the electronic device 101 using the path for transmitting/receiving the audio signals and/or the microphone signals.

The trigger jack device 802 transfers the earphone function mode signal to the electronic device 101 as well. The controller 170 switches to a path for performing the earphone function in response to the earphone function mode signal.

In step 950, when the trigger jack device 802 is connected with the jack interface 150 and it is determined that the jack accessory device is not to perform an earphone function, then the controller 170 controls to connect with the trigger jack device 802 through the path for transmitting/receiving the trigger signal.

In step 960, the controller 170 performs the trigger function between the jack accessory device and the electronic device 101 using the path for transmitting/receiving the trigger signal. The execution of the trigger function is the same as that described with reference to FIG. 5, thus the description thereof will be omitted here.

The method of the present invention may be implemented in the form of program instructions that can be executed through various computers, and may be recorded in a computer-readable recording medium. The computer-readable recording medium may include, alone or in combination, a program command, a data file, a data structure, etc. The program command recorded in the medium is specially designed and configured to execute a method of the present invention. The computer-readable recording medium includes magnetic media, such as hard disks, floppy disks and magnetic tapes, optical media such as a Compact Disc Read-Only Memory (CD-ROM) and a Digital Versatile Disc (DVD), magneto-optical media such as floptical disks, and hardware devices such as a Read-Only Memory (ROM), a Random Access Memory (RAM) and a flash memory, which are specially configured to store and perform program commands. Further, the program command may include a machine language code generated by a compiler or a high-level language code executable by a computer through an interpreter and the like. The hardware devices may be configured to operate as one or more software modules to perform the operations of the present invention, and vice versa.

While the present invention has been shown and described with reference to certain embodiments described herein, it will be understood by those skilled in the art that various changes in form and details may be made therein without departing from the spirit and scope of the present invention. Therefore, the scope of the present invention is defined not by the detailed description of the present invention, but by the appended claims and their equivalents, and thus, all differences within the scope will be construed as being included in the present invention.

What is claimed is:

1. A trigger operation method of an electronic device, the method comprising:
   determining a mode of an ear jack interface when a trigger jack device is inserted into the ear jack interface;
   changing a signal path of the ear jack interface based on the determined mode of the ear jack interface;
   determining, by the electronic device, whether a memory of the trigger jack device is in a writing state in which information has not been recorded, if the mode of the ear jack interface is a trigger function mode;
   when the memory of the trigger jack device is in the writing state,
      identifying the executing task on a screen of the electronic device,
      determining the trigger function related to the executing task,
      configuring, by the electronic device, trigger execution information according to the determined trigger function, and
      recording the trigger execution information in the memory of the trigger jack device inserted into the ear jack interface, through the changed signal path for the trigger function mode;
   when the memory of the trigger jack device is in a reading state in which information has been recorded,
      reading, by the electronic device, the trigger execution information stored in the memory of the trigger jack device, and
      executing a trigger function on the basis of the read trigger execution information; and
   executing an earphone function of the electronic device, through the changed signal path for an earphone function mode, if the mode of the ear jack interface is the earphone function mode.

2. The method of claim 1, wherein the trigger execution information includes at least one of execution instructions for the trigger function, instruction configuration values, and instruction sequence information.

3. The method of claim 2, wherein the trigger function includes at least one of a function for transmitting files, a function for sharing files, a function for performing a communication connection, and a function for changing a configuration option.

4. The method of claim 1, wherein executing the trigger function comprises:
   identifying a type of the electronic device for executing the trigger function; and
   executing the trigger function with respect to the type of the electronic device.

5. An electronic device comprising:
   a communication unit that wirelessly communicates with at least one external device;
   an ear jack interface that includes one or more connection ports, the ear jack interface for inserting an accessory device;
   a switching unit that switches between an earphone function mode and a trigger function mode; and
   a controller that:
      detects insertion of a trigger jack device to the ear jack interface;
      determines a mode of the ear jack interface;
      changes a signal path of the ear jack interface based on the determined mode of the ear jack interface;
      determines whether a memory of the trigger jack device is in a writing state in which information has not been recorded, if the mode of the ear jack interface is a trigger function mode;
      when the memory of the trigger jack device is in the writing state,
         identifies the executing task on a screen of the electronic device, determines the trigger function related to the executing task,
         configures trigger execution information on the basis of sharing configuration information according to the determined trigger function, and
         records, by the electronic device, the trigger execution information in the memory of the trigger jack device inserted into the ear jack interface, through the changed signal path for the trigger function model; and
      when the memory of the trigger jack device is in a reading state in which information has been recorded,
         reads the trigger execution information stored in the memory of the trigger jack device, when a plurality of trigger functions is included in the trigger execution information stored in the memory,
         provides selection notification information for requesting a selection of one of the plurality of trigger functions, through a display unit, and
         executes the selected trigger function on the basis of the read trigger execution information; and
      executes an earphone function of the electronic device, through the changed signal path for the earphone function mode, if the mode of the ear jack interface is the earphone function mode.

6. The electronic device of claim 5, wherein the trigger execution information includes at least one of execution instructions for the plurality of trigger functions, instruction configuration values, and instruction sequence information.

7. The electronic device of claim 6, wherein the plurality of trigger functions includes at least one of a function for transmitting files, a function for sharing files, a function for performing a communication connection, and a function for changing a configuration option.

8. The electronic device of claim 5, wherein the controller identifies a type of the electronic device for executing the selected trigger function, and further executes the selected trigger function with respect to the type of device.

\* \* \* \* \*